US007624624B2

(12) United States Patent
Meskouri et al.

(10) Patent No.: US 7,624,624 B2
(45) Date of Patent: Dec. 1, 2009

(54) PUMP ASSEMBLY AND METHOD FOR LEAK DETECTION OF FLUID SYSTEM

(75) Inventors: Mohamed S. Meskouri, Bloomfield, MI (US); Gary H. Engel, Lake Orion, MI (US); Baltasar Clar, Rochester Hills, MI (US); Leon T. Wade, West Bloomfield, MI (US); Awtar S. Kahlon, Farmington Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 89 days.

(21) Appl. No.: 11/773,800

(22) Filed: Jul. 5, 2007

(65) Prior Publication Data

US 2009/0007638 A1 Jan. 8, 2009

(51) Int. Cl.
*G01M 3/02* (2006.01)

(52) U.S. Cl. .................................... 73/49.7; 73/40.5 R

(58) Field of Classification Search ..................... 73/40, 73/40.5 R, 49.2, 49.3, 49.7
See application file for complete search history.

(56) References Cited

U.S. PATENT DOCUMENTS 4,496,077 A * 1/1985 Zuehlsdorf ................... 222/61
4,794,784 A * 1/1989 Bley ........................... 73/1.03
5,168,748 A * 12/1992 Flora et al. ................... 73/49.2
5,361,636 A * 11/1994 Farstad et al. ................. 73/592
5,416,724 A * 5/1995 Savic .......................... 702/51
5,440,918 A * 8/1995 Oster ...................... 73/40.5 R
5,467,641 A * 11/1995 Williams et al. ............. 73/49.7
5,563,335 A * 10/1996 Howard ......................... 73/46
5,641,899 A * 6/1997 Blomquist et al. ....... 73/114.39
5,715,799 A * 2/1998 Blomquist et al. .......... 123/520
6,807,847 B2 * 10/2004 Steckler et al. .............. 73/49.7
6,885,967 B2 * 4/2005 Rachlin ...................... 702/138
7,043,966 B2 * 5/2006 Kuehn ........................... 73/52
2001/0049958 A1 * 12/2001 Yamaguchi et al. ...... 73/40.5 R
2003/0154770 A1 * 8/2003 Steckler et al. .............. 73/49.7
2004/0139790 A1 * 7/2004 Kuehn ........................ 73/49.3
2005/0055144 A1 * 3/2005 Steckler et al. ............... 701/31
2005/0262932 A1 * 12/2005 Hayashi et al. ............ 73/118.1
2005/0284211 A1 * 12/2005 Cram et al. .................... 73/40
2006/0033075 A1 * 2/2006 Harris ......................... 252/72
2006/0081036 A1 * 4/2006 Lehmann .................... 73/49.3
2006/0254342 A1 * 11/2006 Ito et al. ...................... 73/49.2
2007/0113634 A1 * 5/2007 Kimura ..................... 73/118.1

* cited by examiner

*Primary Examiner*—David A. Rogers
(74) *Attorney, Agent, or Firm*—Ralph E. Smith

(57) ABSTRACT

A method of detecting a leak in a fluid system, which includes a switch that changes state according to pressure in the fluid system. The method includes changing pressure in the fluid system with a pump assembly. The pump assembly includes a predetermined leak that is in fluid communication with the fluid system and that causes the switch to change state after a predetermined time period. The method also includes detecting a leak in the fluid system if the switch changes state within an amount of time less than the predetermined time period.

6 Claims, 2 Drawing Sheets

PUMP ASSEMBLY AND METHOD FOR LEAK DETECTION OF FLUID SYSTEM

The present disclosure relates to leak detection and, more specifically, to a pump assembly and method for leak detection of a fluid system.

BACKGROUND

The statements in this section merely provide background information related to the present disclosure and may not constitute prior art.

Typically, fluid systems are periodically checked for leaks. For instance, a vehicle evaporative fuel system is typically checked for leaks to insure emission compliance, etc.

Some fuel systems include a switch that automatically changes state according to pressure in the vehicle evaporative fuel system, and the presence of a leak is determined according to the switch behavior. For instance, many fuel systems include a vacuum switch that automatically changes state to a CLOSED configuration (i.e., an OH configuration) under a vacuum. When the ambient temperature is decreasing (e.g., at night), a vacuum is created in the fuel system, thereby switching the vacuum switch from OPEN to a CLOSED configuration. An on-board computer monitors that the vacuum switch closes as expected, if the vacuum switch fails to close, a vacuum has not been created, and a leak is thereby detected.

However, this method of leak checking can take a significant amount of time, making it inappropriate for some situations. Thus, in order to check for leaks in less time (e.g., during vehicle assembly), an external tool is coupled to the fuel system to either increase or decrease pressure in the system, and then the system is monitored for significant pressure changes indicative of a leak. However, this testing method can be relatively expensive, can require large and complicated equipment, and can take a significant amount of time.

Thus, it has been proposed to couple a relatively simple pump to the fuel system, create a vacuum in the system, and then monitor the vacuum switch to check for leaks in the fuel system. If the switch remains closed for a predetermined amount of time, then the system is determined to have adequate integrity, and if the switch opens within the predetermined amount of time, the system is determined to have a leak larger than allowed.

However, the vacuum switch may not switch consistently, especially under the influence of small changes in vacuum. More specifically, the vacuum switch may switch at varying times in the presence of the same size leak, thereby reducing the accuracy of the leak check processes. Accordingly, there remains a need for a fluid system leak testing assembly and method that is simpler, less expensive, faster, and more accurate than the prior art.

SUMMARY

A method of defecting a leak in a fluid system that includes a switch that changes state according to pressure in the fluid system is disclosed. The method includes changing pressure in the fluid system with a pump assembly. The pump assembly includes a predetermined leak that is in fluid communication with the fluid system and that causes the switch to change state after a predetermined time period. The method also includes detecting a leak in the fluid system if the switch changes state within an amount of time less than the predetermined time period.

A method of detecting a leak in a vehicle fuel system that includes a switch that changes state according to pressure in the vehicle fuel system is disclosed. The method includes changing pressure in the vehicle fuel system with a pump assembly. The pump assembly includes a predetermined leak that is in fluid communication with the vehicle fuel system and that causes the switch to change state after a predetermined time period. The method further includes detecting a leak in the vehicle fuel system if the switch changes state within an amount of time less than the predetermined time period.

Moreover, a pump assembly is disclosed for leak detection of a fuel system of a vehicle. The fuel system includes a switch that changes state according to pressure in the fuel system. The pump assembly includes a pump for changing pressure in the fuel system and a pipe for fluidly coupling the pump to the fuel system. The pump assembly also includes a coupling member for coupling to the vehicle such that the pipe is in fluid communication with the fuel system. Additionally, the pipe includes a predetermined leak that is in fluid communication with the fluid system and that causes the switch to change state after a predetermined time period.

Further areas of applicability will become apparent from the description provided herein, it should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
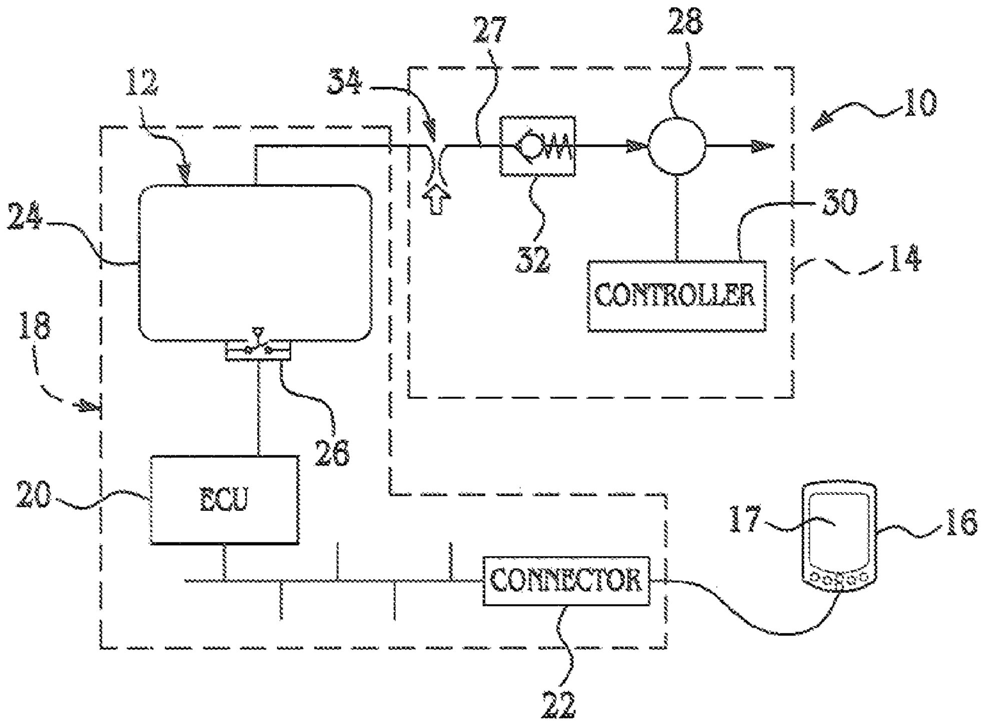
FIG. 1 is a schematic diagram of one embodiment of a leak detection assembly.

The following description is merely exemplary in nature and is not intended to limit the present disclosure, application, or uses, it should be understood that throughout the drawings, corresponding reference numerals indicate like or corresponding parts and features.

Referring initially to FIG. 1, a leak detection assembly 10 is illustrated. The leak defection assembly 10 generally includes a fluid system 12, a pump assembly 14, and a test unit 18. As will be described in greater detail below, the pump assembly 14 includes a predetermined leak 34, which improves the accuracy of the leak checking procedure.

In the embodiment shown, the fluid system 12 is part of a vehicle 18. More specifically, the fluid system 12 is a vehicle fuel system, such as an evaporative fuel system through which evaporative fuel flows. However, it will be appreciated that the fluid system 12 could be of any suitable type without departing from the scope of the present disclosure.

As shown in FIG. 1, the vehicle 18 also includes an engine control unit 20 (ECU) and a connector 22. The ECU 20 is of a known type that electrically communicates with various vehicle components including the fluid system 12. The connector 22 is electrically connected to the ECU 20 and allows for removable connection of the test unit 18 as will be explained in greater detail below, in one embodiment, the connector 2 is of a known type, such as a J1962 connector.

The test unit 18 is of a known type, such as a portable computer. The test unit 18 electrically connects to the connector 22 such that signals can be transmitted between the ECU 20 and the test unit 18. The test unit 18 also includes a display 17. As such, the ECU 20 can transmit a signal to the test unit 18 corresponding to whether the switch 28 is OPEN or CLOSED, and the test unit 16 can communicate this information to the user via the display 17.

Furthermore, the fluid system 12 includes plumbing 24 for directing the flow of fuel within the vehicle 18. It will be appreciated that the plumbing 24 includes a variety of components including, but not limited to, fuel pipes, fuel tank(s), etc. The fluid system 12 also includes a switch 28. In one embodiment, the switch is a vacuum switch. The switch 28 is operatively connected to the plumbing 24 of the fluid system 12 and changes state according to pressure in the plumbing 24. For instance, in the embodiment to be described below, the switch 20 changes state from OPEN to CLOSED (i.e., from OFF to ON) under a vacuum in the plumbing 24. However, the switch 26 could be of any suitable type without departing from the scope of the disclosure. For instance, it will be appreciated that the switch 28 could be configured to switch from CLOSED to OPEN under a vacuum in the plumbing 24 without departing from the scope of the disclosure. It will also be appreciated that the switch 26 could be configured to switch once pressure in the plumbing 24 rises above a threshold amount without departing from the scope of the disclosure. As shown in FIG. 1, the ECU 20 is electrically and operatively connected to the switch 26 to thereby detect whether the switch is OPEN or CLOSED.

As shown in FIG. 1, the fluid system 12 is flu idly and operatively coupled to the pump assembly 14 such that the pump assembly 14 is able to reduce pressure (i.e., draw a vacuum) in the fluid system 12. It will be appreciated that the pump assembly 14 could be configured to increase pressure in the fluid system 12 without departing from the scope of the present disclosure.

More specifically, the pump assembly 14 includes a pipe 27, which is fluidly coupled to the plumbing 24 of the fluid system 12. In one embodiment, the pipe 27 and the plumbing 24 are fluidly coupled via the fuel filler tube of the vehicle 18 similar to the connection of a conventional gas cap. In one embodiment, the pipe 27 and the fluid system 12 are removably coupled.

The pump assembly 14 also includes a pump 28. In the embodiment to be described, the pump 28 is a vacuum pump; however, it will be appreciated that the pump 28 could be a compressor pump without departing from the scope of the disclosure, in one embodiment, the pump 28 is an automatic pump, such as the oilless Miniature Diaphragm 5D1060 Series pump from Gast Manufacturing, inc. In another embodiment, the pump 28 is a manually operated pump. The pump 28 is operatively coupled to the pipe 27 to move fluid through the pipe 27. In one embodiment, the pump 28 is able to generate approximately 2 inches $H_2O$ of vacuum.

The pump assembly 14 also includes a pump controller 30, which is electrically connected to the pump 28. As such, the pump controller 30 sends and receives signals to and from the pump 28 to thereby control operation of the pump 28.

Furthermore, the pump assembly 14 includes a check valve 32. The check valve 32 is operatively coupled to the pipe 27 upstream of the pump 28. In the embodiment shown, the check valve 32 allows fluid flow from the fluid: system 12 toward the pump 28 but limits backflow of fluid in the opposite direction toward the fluid system 12. As such, when the pump 28 is operating, a vacuum is drawn in the fluid system 12. If the fluid system 12 has adequate leak integrity, the fluid system 12 maintains the vacuum.

Also, the pump assembly 14 includes a predetermined leak 34 in the pipe 27 located between the fluid system 12 and the check valve 32. As such, the predetermined leak 34 is in fluid communication with the fluid system 12. In one embodiment, the predetermined leak 34 is at least approximately 0.010 inches wide (e.g., 0.010 inches in diameter). As will be explained in greater detail below, the predetermined leak 34 is intentionally included in the pipe 27 to improve the leak detection accuracy of the test method.

Figure 2A:
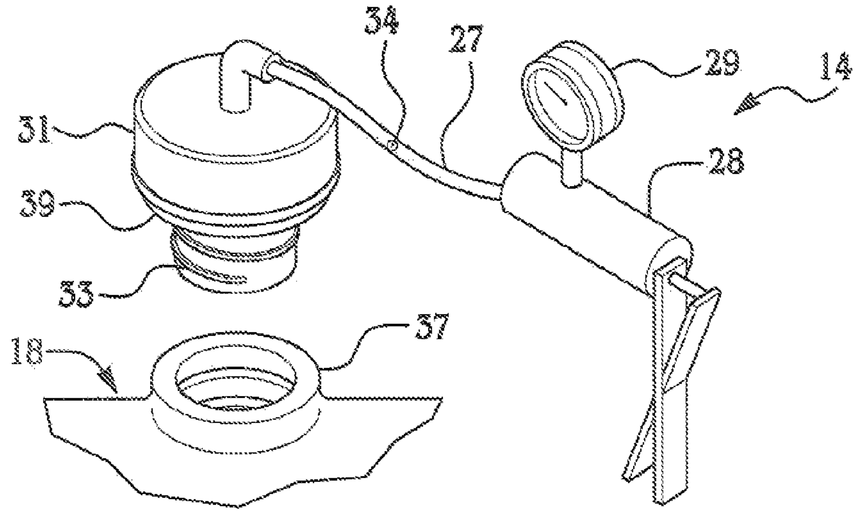
FIG. 2A is a perspective view of one embodiment of a pump assembly of the leak detection assembly of FIG. 1.

Referring to FIG. 2A, one embodiment of the pump assembly 14 is shown. The pump assembly 14 includes a manually-operated pump 28, which is coupled to the pipe 27. As shown, the pipe 27 includes the predetermined leak 34, which is schematically illustrated. The pump 28 includes a pressure gauge 29 to indicate the pressure achieved by the pump 28. The pump 28 also includes a coupling member 31 for coupling to the vehicle 18. In the embodiment shown, the coupling member 31 includes threading 33 so as to threadably couple to the vehicle fuel filler tube 37. Also, the coupling member 31 includes a seal 39 for sealing against the vehicle 18.

In another embodiment shown in FIG. 28, the pump assembly 14 includes an automatic pump 28, which is coupled to the pipe 27. As shown, the pipe 27 includes the predetermined teak 34, which is schematically illustrated. The pump 28 includes a pressure gauge 29 to indicate the pressure achieved by the pump 28. The pump 28 also includes a coupling member 31 for coupling to the vehicle 18 via the vehicle fuel filler tube 37. Also, the coupling member 31 includes a seal 39 for sealing against the vehicle 18. Furthermore, the pump assembly 14 includes a start button 41, which is used to start the pump 28.

Figure 2B:
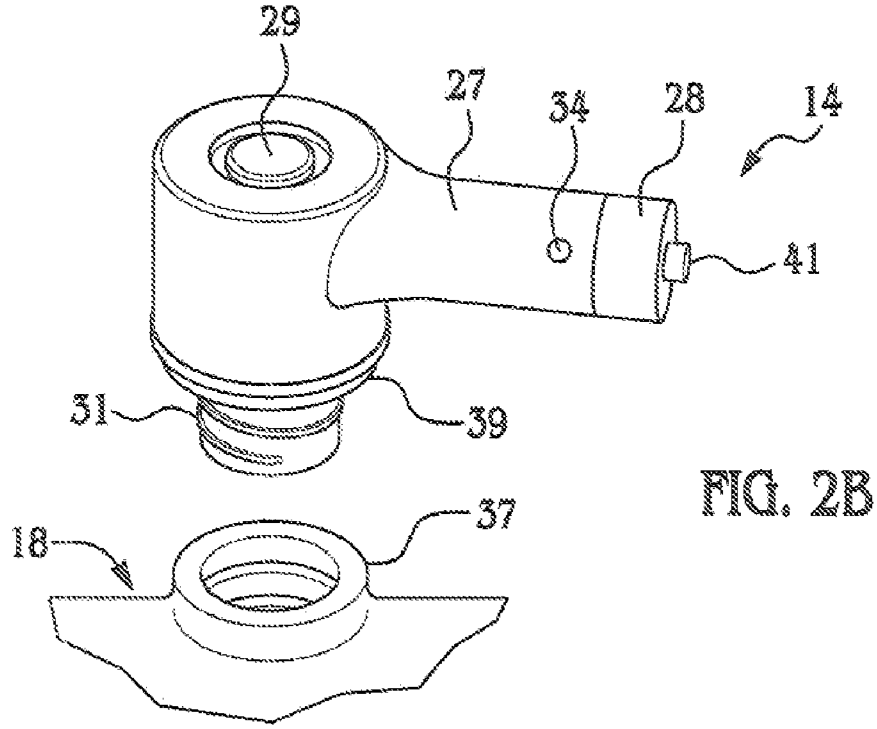
FIG. 2B is a perspective view of another embodiment of a pump assembly of the leak detection assembly of FIG. 1.

Thus, as shown in FIGS. 2A and 2B, the pump assembly 14 is fairly easy to manipulate. Also, the pump assembly 14 can be easily coupled to the vehicle, much like attaching a gas cap over the vehicle filler tube 37. As such, the setup time for leak detection is reduced.

Furthermore, in one embodiment, the pipe 27 includes a threaded cap (not shown) for convenient attachment to the fuel filler tube (not shown) of the vehicle 18, a removable seal for sealed attachment to the fuel filler tube (not shown) of the vehicle 18, and a pressure gauge (not shown) for visual indication of the pressure in the pipe 27.

Figure 3:
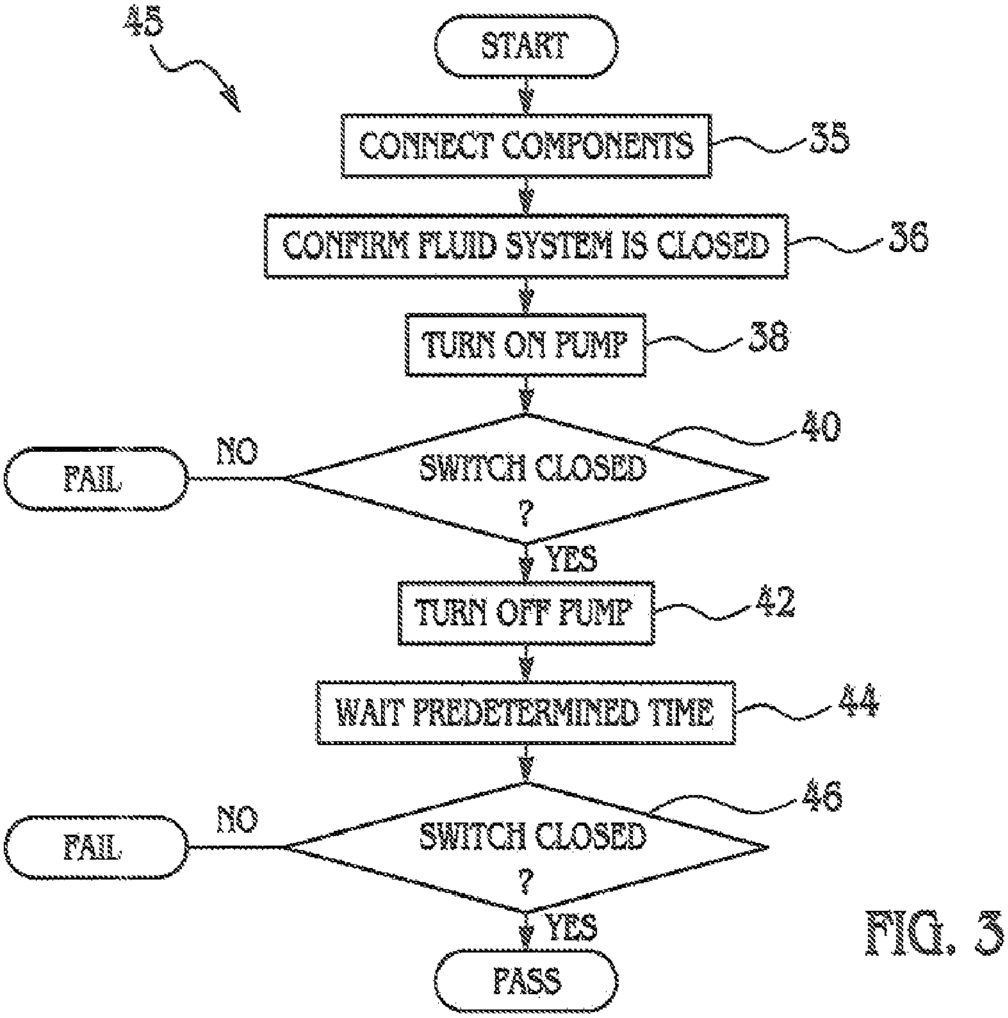
FIG. 3 is a flowchart representing one embodiment of a leak detection method.

Referring now to FIG. 3, a flowchart is illustrated, which represents one embodiment of a leak detection method 45. The method 45 begins in step 35, wherein the fluid system 12 is fluidly connected to the pump assembly 14 and the test unit 16 is electrically connected to the connector 22.

Then, in step 38, it is confirmed that the fluid system 12 is closed. For instance, it is confirmed that any evaporative fuel purge systems or any other like systems are closed such that a vacuum can be achieved in the fluid system 12. In one embodiment, the ECU 20 provides output to the operator confirming that the purge system, etc. Is closed.

Next, in step 38, the operator turns on the pump 38. In one embodiment, a pressure gauge on the pump assembly 14 is used to monitor the pressure, and the pump 38 is operated until approximately 1.5 inches $H_2O$ of vacuum is reached. In one embodiment, the pump 38 is operated for approximately ten (10) seconds to achieve this vacuum.

Next, in decision block 40 it is determined whether the switch 28 is CLOSED via the display 17 on the test unit 18. If the switch 26 is OPEN (i.e., if decision block 40 is answered negatively), then the test results in a FAIL as shown in FIG. 2.

This could be the result of a large leak in the fluid system 12, an operator error, a pump malfunction, or the like. In one embodiment, the method is then repeated to ensure there was no operator error.

However, if decision block 40 is answered affirmatively (i.e., if the switch is CLOSED), then the method proceeds to step 42. In step 42, the pump 28 is turned off. In one embodiment, the pump 28 is turned off automatically by the pump controller 30.

Next, in step 44, the operator waits for a predetermined amount of time. In one embodiment, the operator waits for at least five (5) seconds and at most twenty (20) seconds from the time that the pump 28 is shut off in step 42. More specifically, in one embodiment, the operator waits for approximately fifteen (15) seconds from the time that the pump 28 is fumed off.

Then, in decision block 46, it is determined whether the switch 28 is still CLOSED. If decision block 48 is answered affirmatively (i.e., the switch remains CLOSED), then the fluid system 12 is deemed to have adequate integrity and passes the test. However, if decision block 46 is answered negatively (i.e., the switch changes state to OPEN), then the fluid system 12 fails and is determined to have an unacceptable leak. Also, in one embodiment, the method is then repeated to ensure there was no operator error.

It is understood that, the predetermined leak 34 will cause the switch 26 to change state to OPEN after a predetermined time period, regardless of whether the fluid system 12 has a leak. Thus, the wait time of step 44 is specifically chosen to be less than the predetermined time period it takes for the switch 20 to switch merely due to the predetermined leak 34. For instance, in one embodiment, when the predetermined leak 34 is approximately 0.01 inches wide, the switch 26 changes state from CLOSED to OPEN approximately seventy (70) seconds after the pump 28 is shut down in step 42. Thus, in this embodiment, the predetermined wait time of step 44 is set at approximately fifteen (15) seconds from the time of pump shut-off. Thus, if the switch 28 does switch to OPEN within those fifteen (15) seconds, it can be ensured that the switching occurred due to a leak in the fluid system 12 (and not merely due to the predetermined leak 34).

It is understood that the switch 28 can be inconsistent in the presence of very small leaks and under the influence of small changes in vacuum. The predetermined leak 34 increases the size of the total leakage by a controlled amount. As such, the switching behavior of the switch 28 is more consistent, and the leak testing method is more accurate.

It will be appreciated that size of the predetermined leak 34, the time that the pump 28 runs (i.e., the time between step 38 and step 42), the predetermined wait time of step 44, and the like can be adjusted to calibrate the system and to adjust the sensitivity of the test. For instance, in one embodiment the predetermined leak 34 is approximately 0.01 inches wide (e.g., 0.01 inches in diameter), the pump run time is approximately fan (10) seconds, and the predetermined wait time of step 44 is approximately fifteen (15) seconds. These settings allow leaks in the fluid system 12 of at least 0.02 inches to be consistently detected. However, in another embodiment, the predetermined leak 34 is set larger than 0.01 inches wide, and the predetermined wait time of step 44 is less than fifteen (15) seconds in order to detect leaks of a different size and to detect them more quickly. In other words, it will be understood that the test variables (e.g., the predetermined leak size, the pump run time, the predetermined wait time of step 44, etc.) can be varied to calibrate the system to detect smaller or larger leaks in the fluid system 12. As such, the leak detection assembly 10 has improved versatility.

Furthermore, the leak detection assembly 10 is relatively simple and inexpensive. The testing method relies on many vehicle on-board components. Including the switch 26 to thereby reduce costs and avoid use of more expensive external tools. Also, the pump assembly 14 can be relatively inexpensive, and is relatively simple to set up and couple to the fluid system 12. Also, the test can be performed in a relatively short amount of time (e.g., approximately 25 seconds), which is less than testing methods of the prior art, and which results in cost savings.

The preceding description is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A method of detecting a leak in a vehicle fuel system, the vehicle fuel system including a switch that changes state according to pressure in the vehicle fuel system, the method comprising:

fluidly coupling a pump assembly to the vehicle fuel system via a fuel filler tube of the vehicle, the pump assembly including a predetermined leak that is in fluid communication with the vehicle fuel system and which causes the switch to change state after a predetermined time period;

changing pressure in the vehicle fuel system with the pump assembly; and detecting a leak in the vehicle fuel system if the switch changes state within an amount of time less than the predetermined time period.

2. A pump assembly for leak detection of a fuel system of a vehicle, the fuel system including a switch that changes state according to pressure in the fuel system, the pump assembly comprising:

a pump for changing pressure in the fuel system;

a pipe for fluidly coupling the pump to the fuel system;

a coupling member for coupling to the vehicle such that the pipe is in fluid communication with the fuel system;

wherein the pipe includes a predetermined leak that is in fluid communication with the fluid system and that causes the switch to change state after a predetermined time period.

3. The pump assembly of claim 2, wherein the predetermined leak is at least approximately 0.010 inches wide.

4. The pump assembly of claim 2, wherein the vehicle comprises a fuel filler tube, and wherein the coupling member is threaded so as to threadably couple to the vehicle via the fuel filler tube.

5. The pump assembly of claim 2, wherein the pump is a vacuum pump for drawing a vacuum in the fuel system.

6. The pump assembly of claim 2, further comprising a check valve for allowing fluid flow in one direction through the pipe and limiting fluid flow in an opposite direction through the pipe.

* * * * *